United States Patent [19]

Jacquet et al.

[11] 4,339,561
[45] Jul. 13, 1982

[54] N-(2,5-DIHYDROXY-3,4,6-TRIMETHYL-BENZYL)-ACRYLAMIDE AND -METHACRYLAMIDE POLYMERS

[75] Inventors: Bernard Jacquet, Antony; Claude Mahieu, Paris; Christos Papantoniou, Montmorency, all of France

[73] Assignee: L'Oreal, Paris, France

[21] Appl. No.: 242,525

[22] Filed: Mar. 11, 1981

Related U.S. Application Data

[62] Division of Ser. No. 85,399, Oct. 16, 1979, Pat. No. 4,281,192.

[30] Foreign Application Priority Data

Oct. 26, 1978 [FR] France .................. 78 30461

[51] Int. Cl.³ .............................................. C08F 20/58
[52] U.S. Cl. .................................. 526/304; 526/264; 564/207
[58] Field of Search ........................... 526/264, 304

[56] References Cited

U.S. PATENT DOCUMENTS 3,843,580 10/1974 Andersen ..................... 526/304
4,152,319 5/1979 Kline ............................ 526/304

Primary Examiner—Harry Wong, Jr.
Attorney, Agent, or Firm—Cushman, Darby & Cushman

[57] ABSTRACT

Unsaturated compounds corresponding to the following formula:

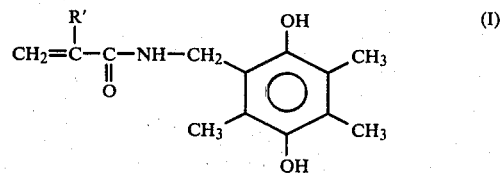

in which: R' represents a hydrogen atom or a methyl radical are provided as antioxidant monomers from which antioxidant polymers can be prepared.

7 Claims, No Drawings

N-(2,5-DIHYDROXY-3,4,6-TRIMETHYL-BENZYL)-ACRYLAMIDE AND - METHACRYLAMIDE POLYMERS

This is a division of application Ser. No. 85,399 filed Oct. 16, 1979, now U.S. Pat. No. 4,281,192.

DESCRIPTION

The present invention relates to unsaturated compounds, a process for their preparation and their use for the preparation of antioxidant polymers.

It is well known that, in most industrial products, it is important to incorporate antioxidant compounds in order to stabilise the products against oxidation by the air or certain oxidising substances. Many such compounds are difficult to use because they possess poor solubility in various industrial products. As a result, for a given industrial product, it is necessary to select from the various antioxidant compounds available a compound which, apart from imparting good antioxidant activity, also possesses good solubility in the formulations of this industrial product. This has the unfortunate consequence that an excellent antioxidant compound cannot be used indiscriminately in various types of industrial products.

It will therefore be appreciated that the search for a suitable antioxidant compound presents numerous difficulties inasmuch as it is not always possible to employ the best antioxidant compound, and it is therefore necessary to carry out tests which are sometimes long and expensive.

For the purpose of being able to use a single antioxidant in various different types of industrial products, it has been proposed to employ polymers containing units derived from the polymerisation of an unsaturated antioxidant compound. Using only one antioxidant, it is then possible to obtain the desired solubility solely by modifying the nature of the monomer (or monomers) which is (or are) copolymerised with the unsaturated antioxidant compound. The choice no longer concerns the antioxidant compound but soley the comonomer (or comonomers). However, such a choice rarely presents itself because most of the common industrial products contain a polymer, and it therefore generally suffices to add a certain amount of the unsaturated antioxidant monomer during the polymerisation of the monomer (or monomers) without thereby modifying the properties of the polymer, in particular its solubility.

Various unsaturated antioxidant compounds have already been proposed, but these do not always make it possible to impart good antioxidant properties to the polymers obtained.

We have now found, according to the present invention, that, by using an unsaturated derivative of trimethylhydroquinone, it is possible to reduce or overcome the disadvantages encountered with the unsaturated antioxidant compounds used hitherto.

The present invention provides an unsaturated compound which corresponds to the following general formula:

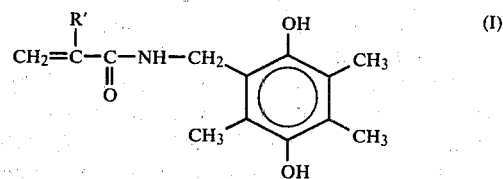

in which: R' represents a hydrogen atom or a methyl radical.

The compound according to the formula (I) is thus either N-(2,5-dihydroxy-3,4,6-trimethyl-benzyl)-acrylamide or N-(2,5-dihydroxy-3,4,6-trimethyl-benzyl)-methacrylamide.

These compounds are solids and have a UV absorption in the region of 294 nm.

The present invention also provides a process for the preparation of the compounds according to the formula (I), this process consisting in condensing N-hydroxymethyl-acrylamide or - methacrylamide with trimethylhydroquinone in an organic solvent and in the presence of a mineral acid (such as HCl or $H_2SO_4$).

The organic solvent can be, for example, tetrahydrofurane. The condensation reaction is generally carried out at ambient temperature (say 25° C.) for, for example, 5 to 20 hours.

The present invention also provides an anti-oxidant polymer which contains recurring units corresponding to the following formula:

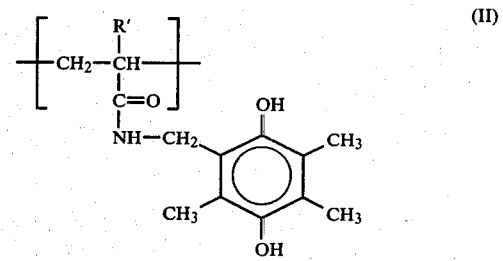

in which R' is as defined above.

The polymer generally contains from 1 to 100%, and preferably from 10 to 80%, by weight of units (II).

According to a preferred embodiment of the invention, the polymer also contains units derived from the polymerisation of, for example, optionally quaternised 2-N,N-dimethylamino-ethyl methacrylate, N-vinylpyrrolidone, stearyl acrylate, lauryl acrylate, stearyl methacrylate and lauryl methacrylate.

The polymers according to the invention find application as antioxidants in particular in the field of plastics, paints and varnishes, oils, packaging, paper pulps, dyestuffs, cleaning materials and cosmetic products.

The following Examples further illustrate the present invention.

EXAMPLE 1

Process for the preparation of N-(2,5-dihydroxy-3,4,6-trimethyl-benzyl)-acrylamide 800 g of 6 N hydrochloric acid, 500 ml of tetrahydrofurane and 76 g of trimethylhydroquinone are introduced, whilst stirring, into a reactor purged with nitrogen.

As soon as the solution becomes homogeneous, 50 g of N-hydroxymethyl-acrylamide are introduced and stirring is continued for about 16 hours at 25° C.

The reaction mixture is then filtered and the crystalline compound collected is washed with water and then drained. After recrystallisation from ethyl acetate, 57.8 g of the unsaturated monomer of the formula (I) in which R' represents a hydrogen atom are obtained. Melting point = 191° C.

UV spectrum $\lambda_{max}.^{THF}=294$ nm.

Chromatography on silica, F 1500 LS 254 plates, Schleicher and Schull; solvent; acetone; eluent: 1/1 chloroform/ethyl acetate.

$R_f$. 0.3 (trimethylhydroquinone: $R_f=0.6$) Oxidation/reduction potential: Solvent: ethanol 5 mol; buffer solution: pH = 10 ($CO_3^{--}/CO_3H^-$ 15 ml);

Mercury electrode: $E_{1/2}=-338$ mV/SCE (Saturated Calomel Electrode);

Elementary analysis: calculated %: C: 66.3; H; 7.2; N 5.9; found %: C: 66.47; H: 7.37; N: 5.83.

PREPARATION OF ANTIOXIDANT COPOLYMERS

EXAMPLE A 3 g of the monomer prepared in accordance with Example 1, 7 g of 2-N,N-dimethylamino-ethyl methacrylate quaternised with dimethyl sulphate, 30 g of dimethylformamide and 0.5 g of azo-bis-isobutyronitrile are introduced into a reactor. The mixture is then heated at 80° C. for 24 hours, under nitrogen, whilst stirring. After cooling, the polymer solution is poured into 250 ml of chloroform. 3 g of polymer are obtained.

Chromatography on silica gel: Solvent: methanol; eluent: 20/10/10 chloroform/methanol/ethyl acetate; $R_f=0$ ($R_f$ of the monomer according to Example 1 = 0.92)

Elementary analysis: calculated%: C: 49.6; H: 7.40; N: 5.2; S: 7.9; found %: C: 45.8; H: 6.80; N: 5.01; S: 8.25.

Oxidation/reduction potential: $E_{\frac{1}{2}}=-340$ mV/SCE

A second half-wave at −40 mV is attributed to the hydrogen peroxide formed during the determination.

EXAMPLE B 1.4 g of N-vinylpyrrolidone, 0.6 g of the monomer prepared in accordance with Example 1, 6 g of ethanol and 0.1 g of azo-bis-isobutyronitrile are introduced into a 50 cm³ round-bottomed flask. The reaction mixture is heated under reflux for 24 hours and it is then precipitated in a 90/10 isopropanol/ethanol mixture. 0.8 g of the expected copolymer is obtained.

Thin layer chromatography in accordance with the technique indicated in Example A does not show the presence of free monomer.

EXAMPLE C 1 g of stearyl acrylate, 1 g of the monomer according to Example 1, 6 g of ethanol and 0.1 g of azo-bis-isobutyronitrile are introduced into a 50 cm³ round-bottomed flask.

The reaction mixture is heated under reflux for 24 hours and it is then precipitated in methanol.

Thin layer chromatography in accordance with the technique of Example A does not shown the presence of free monomer.

Elementary analysis: calculated %: C: 72.05; H: 9.80; N: 2.90; found %: C: 72.25; H: 9.25; N: 2.69.

We claim:

1. An antioxidant polymer which contains units of the following general formula:

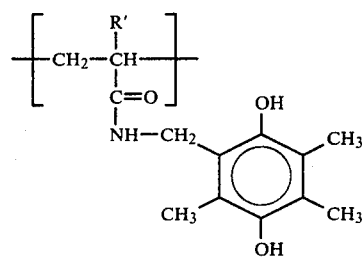

in which: R' represent a hydrogen atom or a methyl radical.

2. A polymer according to claim 1 which contains from 1 to 100% by weight of said units.

3. A polymer according to claim 1 which contains 10 to 80% by weight of said units.

4. A polymer according to any one of claims 1 to 3, which also contains units derived from the polymerization of optionally quaternised 2-N,N-dimethylamino-ethyl methacrylate, N-vinylpyrrolidone, stearyl acrylate, lauryl acrylate, stearyl methacrylate or lauryl methacrylate.

5. A process for preparing a polymer as defined in claim 1 which comprises polymerizing a compound of the formula:

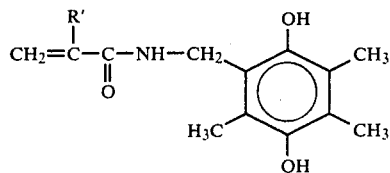

wherein R' represents hydrogen or methyl.

6. The process of claim 5 wherein said compound is N-(2,5-dihydroxy-3,4,6-trimethyl-benzyl)-acrylamide.

7. The process of claim 5 wherein said compound is N-(2,5-dihydroxy-3,4,6-trimethyl-benzyl)-methacrylamide.

* * * * *